United States Patent
Adelman et al.

(10) Patent No.: US 8,434,434 B2
(45) Date of Patent: May 7, 2013

(54) CRANKCASE BLOW-BY GAS TREATMENT ASSEMBLY AND METHOD OF TREATING BLOW-BY GAS

(75) Inventors: Brad J. Adelman, Chicago, IL (US); Edward M Derybowski, Hanover Park, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 352 days.

(21) Appl. No.: 12/623,721

(22) Filed: Nov. 23, 2009

(65) Prior Publication Data
US 2011/0120433 A1    May 26, 2011

(51) Int. Cl.
*F01M 13/00* (2006.01)
(52) U.S. Cl.
USPC ......... 123/41.86; 123/572; 123/573; 123/574
(58) Field of Classification Search .................. 123/572, 123/573, 574, 41.86
See application file for complete search history.

(56) References Cited

U.S. PATENT DOCUMENTS

| | | | |
|---|---|---|---|
| 5,307,627 A * | 5/1994 | Christensen et al. | 60/274 |
| 6,152,120 A * | 11/2000 | Julazadeh | 123/572 |
| 6,477,831 B1 * | 11/2002 | Ballinger et al. | 60/284 |
| 2002/0185009 A1 * | 12/2002 | Schlaps | 96/413 |
| 2006/0272508 A1 * | 12/2006 | Hoke et al. | 96/134 |
| 2008/0110156 A1 * | 5/2008 | Winsor | 60/286 |
| 2008/0125309 A1 * | 5/2008 | Fujdala et al. | 502/74 |
| 2009/0038295 A1 * | 2/2009 | Gonze et al. | 60/295 |
| 2010/0126150 A1 * | 5/2010 | Choi | 60/297 |

* cited by examiner

*Primary Examiner* — Marguerite McMahon
*Assistant Examiner* — James Kim
(74) *Attorney, Agent, or Firm* — Mark C. Bach; Jeffrey P. Calfa

(57) ABSTRACT

A blow-by treatment assembly (10) for a vehicle having an engine (22) emitting blow-by gas (18) includes a duct (16) for receiving blow-by gas from the engine. A catalyst trap (14) is disposed in fluid communication with the duct (16). The catalyst trap (14) removes hydrocarbon emissions from the blow-by gas (18). A pump (12) pumps the blow-by gas (18) through the catalyst trap (14). An outlet (32) is in fluid communication with the catalyst trap (14) for emitting the blow-by gas to either the ambient or to a tailpipe.

6 Claims, 1 Drawing Sheet

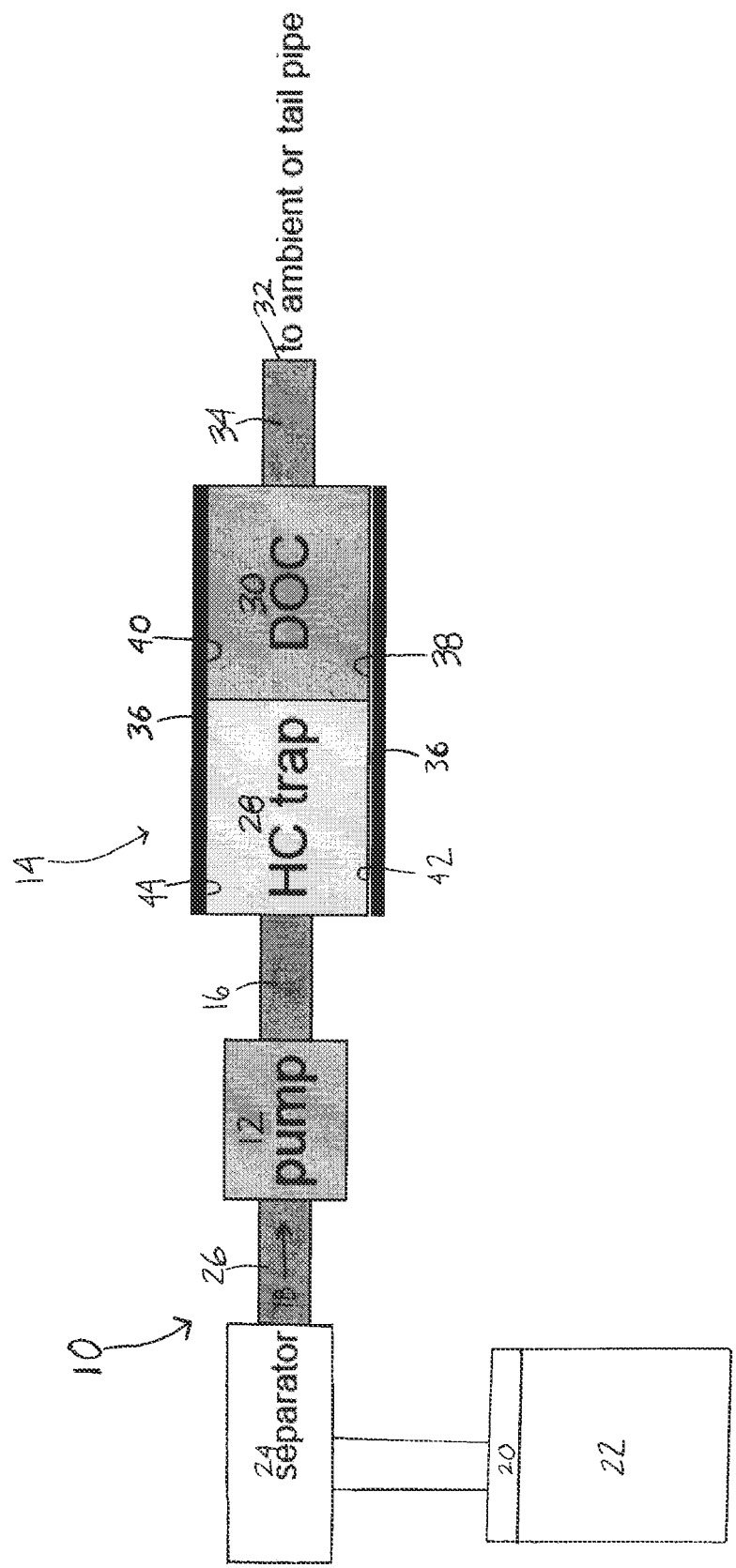

CRANKCASE BLOW-BY GAS TREATMENT ASSEMBLY AND METHOD OF TREATING BLOW-BY GAS

BACKGROUND

Embodiments described herein relate generally to ventilation of a combustion engine. More specifically, embodiments described herein relate to ventilation of blow-by gas from a crankcase of a combustion engine.

During operation of a combustion engine, gas is pressed out of the combustion chamber and into a crankcase through a gap between a piston ring and a cylinder wall. The gas that is pressed out through the gap is called blow-by gas. Unless removed from the crankcase, the blow-by gas increases the pressure inside the crankcase.

Conventionally, the blow-by gas may be vented from the crankcase to the ambient, however blow-by ventilation to the ambient is considered part of a vehicle's total emissions. For this reason, emission of the blow-by to the ambient is usually avoided.

The blow-by gas may also be vented to an engine intake, for example via a crankcase vacuum pressure regulating valve. Venting blow-by gas to the engine intake can potentially contaminate the air intake hardware, such as the compressor or the intake manifold. Additionally, particulates can form when the blow-by gas is combusted in the combustion chamber.

Another method of venting the blow-by gas is forcing the blow-by gas into the exhaust gas so that both emissions are treated by an aftertreatment system of the vehicle, for example either a diesel oxidation catalyst (DOC) and/or a diesel particulate filter (DPF). To inject the blow-by gas into the exhaust, the blow-by gas must be heated and compressed so that the blow-by gas can remain in a gas phase. Additionally, oil mist in the blow-by gas may deposit on the DOC and cover the active sites of the catalyst, which may lower the effectiveness of the aftertreatment system, for example by lowering levels of passive DPF regeneration and increasing the light-off temperatures needed for active DPF regeneration. Alternatively, the blow-by gas emissions may result in higher rates of ash accumulation at the DPF, which may require more frequent ash removal servicing.

SUMMARY OF THE INVENTION

A blow-by treatment assembly for a vehicle having an engine emitting blow-by gas includes a duct for receiving blow-by gas from the engine. A catalyst trap is disposed in fluid communication with the duct. The catalyst trap removes hydrocarbon emissions from the blow-by gas. A pump pumps the blow-by gas through the catalyst trap. An outlet is in fluid communication with the catalyst trap for emitting the blow-by gas to either the ambient or to a tailpipe.

BRIEF DESCRIPTION OF THE DRAWINGS

FIG. 1 is a schematic view of a blow-by treatment assembly in fluid communication with an engine.

DETAILED DESCRIPTION

Referring now to FIG. 1, a blow-by treatment assembly is indicated generally at 10 and includes a pump 12 in fluid communication with a catalyst trap, indicated generally at 14. A duct 16 may be disposed between the pump 12 and the catalyst trap 14 to provide fluid communication of blow-by gas 18 from the pump to the catalyst trap, and in the direction indicated by the arrow in FIG. 1. It should be appreciated that the duct may include any pipe, tube, vessel, channel that conveys fluid.

After the blow-by gas 18 is emitted from a crankcase 20 of an engine 22, the blow-by gas contains an oil mist. The oil mist is separated out of the blow-by gas 18 with a mist separator 24 that is located at or downstream of the engine 22, as conventionally known. The mist separator 24 does not remove all of the hydrocarbons contained in the blow-by gas 18.

The mist separator 24 is arranged upstream of an inlet duct 26 of the blow-by treatment assembly 10 for carrying the blow-by gas 18 to the pump 12. The pump 12 may be a motor driven pump, an air injector pump, a gas injector pump, or any other pump to create a pressure differential between an inlet end of the pump and the outlet end of the pump, causing a pumping action with the blow-by gas contained within the pump 12.

The pump 12 pumps the blow-by gas 18 to the catalyst trap 14 via the duct 16. The catalyst trap 14 absorbs and stores the hydrocarbon emissions of the blow-by gas 18. The catalyst trap 14 includes a hydrocarbon trap 28 in fluid communication with and upstream of a diesel oxidation catalyst (DOC) 30.

The hydrocarbon trap 28 uses sorbent materials to absorb at least a first portion of the hydrocarbon emissions of the blow-by gas 18. The hydrocarbon trap 28 may be formed of various materials, including zeolites, alumina-silicates, activated carbon, or any other porous materials known for trapping hydrocarbons emissions. The hydrocarbon trap 28 may also trap some particulates in the blow-by gas 18.

After depositing hydrocarbon emissions at the hydrocarbon trap 28, the blow-by gas 18 flows through the DOC 30. The DOC 30 may have a porous ceramic honey-comb structure that is coated with a material that catalyzes a chemical reaction to remove some or all of the remaining hydrocarbon emissions. To enable the conversion of the stored hydrocarbons, the DOC 30 may contain Platinum Group Metals (PGM) such as Platinum (Pt) and Palladium (Pd).

After flowing through the DOC 30, the blow-by gas 18 flows to an outlet 32, either a tail pipe or an ambient. An outlet duct 34 may fluidly communicate the blow-by gas 18 from the DOC 30 to the outlet 32.

Through use, the absorption sites in the hydrocarbon trap 28 become saturated with hydrocarbons. From time to time, the hydrocarbon trap 28 may need to be regenerated so that the hydrocarbon trap can continue to absorb emissions of the blow-by gas 18. The DOC 30 initiates a regeneration event at the hydrocarbon trap 28.

At least one heating element 36 is disposed adjacent the DOC 30 to achieve a light-off temperature of the DOC. A plurality of heating elements 36 may be disposed on or near one or more surfaces 38, 40 of the DOC 30 and one or more surfaces 42, 44 of the hydrocarbon trap 28. The heating elements 36 may be heated electrically or by other methods. The hydrocarbon trap 24 may also be heated, however at a slower rate, at a lower temperature, or staggered in time behind the DOC 30, so that the hydrocarbon trap 28 does not achieve a temperature where the stored hydrocarbon emissions materials on the hydrocarbon trap 28 physically evolve before the DOC 30 has achieved the light-off temperature necessary to burn the stored emissions materials at the hydrocarbon trap 28. In this configuration, the DOC 30 achieves the light-off temperature prior to the stored emissions materials physically evolving. The light-off temperature of the DOC 30 will depend upon the catalyst formulation and PGM loading and may occur around 200° C.

When the light-off temperature of the DOC 30 is achieved, the heat from the DOC is transferred to the adjacent hydrocarbon trap 28. The deposited hydrocarbons at the hydrocarbon trap 28 are burned to form carbon dioxide ($CO_2$) and water ($H_2O$) while the hydrocarbon trap 28 is regenerated. It is possible that the heating elements 36 are activated by a control system either automatically or by initiation of the user.

It is possible that additional filters may be disposed on the blow-by treatment assembly 10. Further, it is possible that the blow-by gas 18, after being treated by blow-by treatment assembly 10, may be directed from the catalyst trap 14 to the intake manifold of the engine 22 or to the aftertreatment system of the vehicle. Since the blow-by gas will be free or substantially free of heavy hydrocarbons, there is less likelihood to cause fouling of the intake manifold.

The blow-by treatment assembly 10 treats the blow-by gas 18 in a manner that does not add to the aggregate emissions from the engine 22 because the hydrocarbon emissions are first stored on the hydrocarbon trap 28 then combusted to form carbon dioxide ($CO_2$) and water ($H_2O$). The blow-by treatment assembly 10 treats the blow-by gas 18 before being emitted to outlet 32, either the ambient or the tail pipe.

The blow-by treatment assembly 10 is an alternative to diverting the blow-by gas 18 to the air intake hardware of the engine, where the intake hardware can become damaged by exposure to the blow-by gas. Further, the blow-by treatment assembly 10 is an alternative to combining the blow-by gas 18 with the exhaust gas and diverting it to the aftertreatment system of the vehicle, which may require heating and compressing the blow-by gas 18 to combine it with the exhaust gas. Further still, the blow-by treatment assembly 10 does not expose the vehicle's aftertreatment system to untreated blow-by gas 18.

What is claimed is:

1. A blow-by treatment assembly for a vehicle having an engine emitting blow-by gas from a gap between a piston ring and a cylinder wall, the engine having a crankcase emitting the blow-by gas, the blow-by treatment assembly comprising:
   a duct for receiving blow-by gas from the crankcase of the engine, the duct in fluid communication with the crankcase;
   a mist separator in fluid communication with the duct, the mist separator in downstream fluid communication from the crankcase;
   a catalyst trap disposed in fluid communication with the duct and located in downstream fluid communication with the mist separator, the catalyst trap comprising a hydrocarbon trap for trapping at least a portion of the hydrocarbons in the blow-by gas not removed by the mist separator upstream from and adjacent to a diesel oxidation catalyst having a heating element for bringing the diesel oxidation catalyst to a light off temperature so that the hydrocarbon trap does not achieve a temperature where the stored hydrocarbons on the hydrocarbon trap physically evolve before the diesel oxidation catalyst has achieved the light off temperature necessary to burn the stored hydrocarbons
   a pump for pumping the blow-by gas through the catalyst trap, wherein the pump is downstream of the crankcase, wherein the blow-by gas is not combined with exhaust gas from the engine before treatment; and
   an outlet in fluid communication with the catalyst trap for emitting the blow-by gas to one of an ambient and a tailpipe.

2. The blow-by treatment assembly of claim 1 in which the heating element is disposed adjacent the diesel oxidation catalyst for achieving the light-off temperature of the diesel oxidation catalyst to regenerate the hydrocarbon trap.

3. The blow-by treatment assembly of claim 2 wherein the heating element is disposed on at least one surface of the diesel oxidation catalyst for achieving a light-off temperature of the diesel oxidation catalyst.

4. The blow-by treatment assembly of claim 2 wherein the heating element comprises a plurality of heating elements, wherein at least one heating element is disposed on at least one surface of the hydrocarbon trap.

5. The blow-by treatment assembly of claim 1 further comprising an outlet duct fluidly connecting the catalyst trap with one of the ambient and the tailpipe.

6. A method of treating blow-by gas of an engine before release to the ambient, the engine having a crankcase emitting the blow-by gas having hydrocarbons entrained therein, the method comprising the steps of:
   transporting the blow-by gas out of the crankcase and to a duct in fluid communication to the crankcase;
   transporting the blow-by gas from the duct to a mist separator which separates out a portion of the hydrocarbons entrained in the blow-by;
   transporting the blow-by gas from the mist separator;
   to a catalyst trap having a hydrocarbon trap for trapping at least a portion of the hydrocarbons in the blow-by as not removed by the mist separator upstream from and adjacent to a diesel oxidation catalyst having a heating element for bringing the diesel oxidation catalyst to a light off temperature so that the hydrocarbon trap does not achieve a temperature where the stored hydrocarbons on the hydrocarbon trap physically evolve before the diesel oxidation catalyst has achieved the light off temperature necessary to burn the stored hydrocarbons; and
   bringing the diesel oxidation catalyst to the light off temperature.

* * * * *